United States Patent [19]

Tanahashi

[11] Patent Number: 4,650,211
[45] Date of Patent: Mar. 17, 1987

[54] VEHICLE REAR WHEEL SUSPENSION WITH DUAL LINKS EXTENDING IN THE OVERALL FORWARD DIRECTION

[75] Inventor: Haruhiko Tanahashi, Toyota, Japan

[73] Assignee: Toyota Jidosha Kabushiki Kaisha, Toyota, Japan

[21] Appl. No.: 735,135

[22] Filed: May 17, 1985

[30] Foreign Application Priority Data

Aug. 23, 1984 [JP] Japan .............. 59-127767[U]

[51] Int. Cl.[4] .............................................. B60G 3/00
[52] U.S. Cl. .................................... 280/701; 280/725
[58] Field of Search .............. 280/690, 700, 701, 724, 280/688, 725

[56] References Cited

U.S. PATENT DOCUMENTS

| 4,245,853 | 1/1981 | Inoue et al. | 280/701 |
|---|---|---|---|
| 4,257,623 | 3/1981 | Kawase et al. | 280/701 |
| 4,515,391 | 5/1985 | Koide | 280/701 |
| 4,530,514 | 7/1985 | Ito | 280/701 |

FOREIGN PATENT DOCUMENTS

| 0083235 | 12/1982 | European Pat. Off. |
| 2439123 | 5/1980 | France . |
| 57-141109 | 9/1982 | Japan . |
| 5760808 | 2/1985 | Japan . |
| 5772306 | 4/1985 | Japan . |
| 5776106 | 4/1985 | Japan . |
| 60-116513 | 6/1985 | Japan . |
| 60-99105 | 7/1985 | Japan . |
| 60-118505 | 8/1985 | Japan . |
| 60-118504 | 8/1985 | Japan . |
| 60-165206 | 11/1985 | Japan . |
| 2106460 | 4/1983 | United Kingdom . |

OTHER PUBLICATIONS

Patent Abstracts of Japan, vol. 7, No. 173 (M-232)[1318], 30th July 1983; & JP-A-58 076 316 (Nissan) 09-05-1983.

Primary Examiner—Richard A. Bertsch
Attorney, Agent, or Firm—Oblon, Fisher, Spivak, McClelland & Maier

[57] ABSTRACT

A dual link type suspension for suspending a body of a vehicle with respect to a wheel, including a wheel support member for supporting the wheel to be rotatable about a horizontal axis generally lateral to the vehicle body, front and rear link members arranged side by side and extending generally horizontally and laterally to the vehicle body and generally flexibly connected with the vehicle body at their inboard ends and with the wheel support member at their outboard ends, the connection between the front link member and the wheel support member being forward from the axis of rotation of the wheel by a distance L1, while the connection between the rear link member and the wheel support member being rearward from the axis of rotation of the wheel by a distance L2, and a strut rod member extending generally horizontally and longitudinally to the vehicle body and generally flexibly connected with the vehicle body at one end thereof and with the vehicle support member at another end thereof, wherein the front and rear link members inclined relative to an exact lateral direction of the vehicle body by a first angle t1 and a second angle t2, respectively, and wherein, by expressing these first and second angles in positive values or negative values according to whether the front and rear link members are inclined rearwardly or forwardly as viewed from the outboard ends thereof toward the inboard ends thereof, respectively, wherein the sum L2×tan (t1) and L1×tan (t2) is a substantial positive value.

4 Claims, 15 Drawing Figures

VEHICLE REAR WHEEL SUSPENSION WITH DUAL LINKS EXTENDING IN THE OVERALL FORWARD DIRECTION

FIELD OF THE INVENTION

1. Background of the Invention

The present invention relates to the field of automotive vehicle suspensions, and in particular to a rear suspension for an automotive vehicle which is of the dual link type.

2. Discussion of the Background

The present patent application has been at least partially prepared from material which has been included in Japanese Utility Model Application No. Sho 59-127767 (1984), which was invented by the same inventors as the present patent application, and the present patent application hereby incorporates the text of that Japanese Patent Application and the claim or claims and the drawings thereof into this specification by reference; a copy is appended to this specification.

With regard to the suspension for the rear wheels of a vehicle, particularly as suited for application to the rear wheels of a front wheel drive vehicle, various types have been known from the past. A basic type is as shown in schematic plan view in FIG. 1 of the accompanying drawings, which is a figure adapted from Japanese Utility Model Laying Open Publication No. 55-42679 (1980). In this FIG. 3 represents the rear wheel, which is mounted to a wheel support member 1 so as to be rotatable about a horizontal axis transverse to the vehicle body. A generally triangular metal plate 100 has its one end pivoted to the body of the vehicle around a horizontal axis longitudinal to the vehicle body by a pivot 250. A means is provided for biasing the outboard end of the plate 100 and the wheel support member 1 in the downward direction to the vehicle body, but is not shown in the figure. And a strut rod 6 is provided for ensuring longitudinal stability for the suspension construction, and its rear end 6a is flexibly coupled to an outboard portion of the plate 100 by a flexible and resilient coupling construction 6c, while its front end 6b is flexibly coupled to the vehicle body by a flexible and resilient coupling construction 6d. Thus, this strut rod 6 prevents the wheel 3, etc., from moving to any substantial amount in either the forwards or rearwards direction with respect to the vehicle body, but still allows substantially free upwards and downwards movement of the wheel 3 relative to the body to perform suspension action. And when a sudden shock force acts on the wheel 3, for example in the direction to the rear of the vehicle, such as may be suffered when said wheel 3 passes over a irregularity in the road surface or when the vehicle is suddenly accelerated or is suddenly braked, then as a reaction a tension load will be set up in the system including the strut rod member 6 and the flexible coupling constructions 6c and 6d, and the resilience of the coupling constructions 6c and 6d cushions this shock and moderates it as it is transmitted to the vehicle body. Thereby the effects of shock and vibration felt inside the vehicle body are mitigated.

However, the prior art construction including a plate member is rather unsophisticated, and accordingly the so called dual link type construction for a rear suspension has been developed. FIG. 2 of the accompanying drawings shows an example of this type of suspension—this figure has been adapted from Japanese Utility Model Laying Open Publication No. 57-141109 (1982)—and FIG. 4 shows a variation thereof—this figure has been adapted from Japanese Utility Model Laying Open Publication No. 58-209605 (1983)—and FIG. 5 shows yet another variation thereof—this figure has also been adapted from the previously cited Japanese Utility Model Laying Open Publication No. 55-42679 (1980). In all of these proposals, the strut rod member 6 is substantially as previously described, but instead of the plate member 100 a front link member 4 and a rear link member 5 are provided, and these front and rear link members 4 and 5 are linked at their respective outboard ends 4a and 5a by coupling constructions 4c and 5c respectively to the wheel support member 1, while they are linked at their respective inboard ends 4b and 5b by coupling constructions 4d and 5d respectively to the vehicle body. This dual link type of construction is much more economical of materials and of weight, than the plate type of construction of FIG. 1. With regard to the arrangement of the parts, in the FIG. 2 construction the front and rear link members 4 and 5 are substantially parallel and both extend substantially perpendicular to the longitudinal direction of the vehicle. In the FIG. 4 construction, the front link member 4 extends, from its inboard end to its outboard end, in the rearward direction at a certain angle to the direction transverse to the vehicle body, and on the other hand the rear link member 5 extends, from its inboard end to its outboard end, in the forward direction at substantially the same certain angle to the direction transverse to the vehicle body. And in the FIG. 5 construction the front link member 4 extends, from its inboard end to its outboard end, in the rearward direction at a certain angle to the direction transverse to the vehicle body, while on the other hand the rear link member 5 extends, from its inboard end to its outboard end, in the forward direction at a lesser angle than said certain angle to the direction transverse to the vehicle body. Thus, in all these prior arts, the overall direction of the front and the rear link members, from their inboard ends to their outboard ends, has been either rearwards, or neutral, with respect to the longitudinal direction of the vehicle body.

However, all these prior arts have been subject to the following difficulty, which will now be explained in detail with reference to the FIG. 2 construction as an example. When a vehicle is turning, considering the outside rear wheel on the turn which is very much more heavily weighted than the inside wheel and the suspension behavior of which accordingly is dominant, the road surface applies via the medium of friction a force to said wheel which is in the inboard direction, and is angled somewhat towards the rear of the vehicle from the direction perpendicular to its longitudinal axis. This is at least partly because of the force due to rolling friction; a diagram of the forces involved is shown in FIG. 3 and will be discussed in more detail later in this specification. Since in the FIG. 2 type of rear suspension as detailed above the direction of the front and the rear link members from their inboard ends to their outboard ends is substantially perpendicular to the longitudinal direction of the vehicle body, therefore, although of course tension and/or compression forces in these front and rear link members are able to cancel the inward component of the abovementioned friction force, they are not able to produce a force in the forwards direction of the vehicle to cancel the rearwards component of the friction force, and hence it falls to the strut rod to exert a tension force in this forward direction on the wheel support member. This tension force in the strut rod is required for all the time that the vehicle is going around the turn, and accordingly the flexible and resilient coupling constructions 6c and 6d at the ends 6a and 6b of this strut rod are required to be in an at least semi compressed state at all times during vehicle turning. In this state, when a further sudden or shock force acts on the wheel 3 in the direction towards the rear of the vehicle, such as when said wheel 3 passes over a irregularity in the rod surface or when the vehicle is suddenly accelerated or is suddenly braked, then as a reaction a further tension load is set up in the system including the strut rod member 6 and the flexible coupling constructions 6c and 6d which are already in a partly compressed state. Because the flexible members such as rubber members of these flexible coupling constructions 6c and 6d are typically made to give a non linear compression or elastic performance, in this situation these rubber members are further compressed while in an operational zone of relatively high elastic coefficient, and therefore they are not able to properly provide their function of by their resilience cushioning this shock and moderating it. Thereby the effects of shock and vibration tend to be transmitted to the inside of the vehicle body, and are not well mitigated. Thereby, the vehicle ridability when turning is deteriorated.

SUMMARY OF THE INVENTION

Accordingly, it is the primary object of the present invention to provide a dual link type vehicle suspension which avoids the above mentioned problem.

It is a further object of the present invention to provide such a dual link type vehicle suspension which, while the vehicle is turning, does not subject the strut rod assembly including its resilient coupling constructions to a constant and considerably great tensile or compressive force.

It is a further object of the present invention to provide such a dual link type vehicle suspension which, while the vehicle is turning, keeps the strut rod assembly including its resilient coupling constructions substantially in the most appropriate state for absorbing and dissipating shock and vibration energy.

It is a further object of the present invention to provide such a dual link type vehicle suspension which ensures that while the vehicle is turning shock and vibration produced when the outside rear wheel passes over a irregularity in the road surface or when the vehicle is suddenly accelerated or is suddenly decelerated are well attenuated.

It is a further object of the present invention to provide such a dual link type vehicle suspension which ensures that while the vehicle in turning impact shock and vibration on the outside rear wheel are not in great part transmitted to the vehicle.

It is a yet further object of the present invention to provide such a dual link type vehicle suspension which ensures that while the vehicle is turning the steering stability is good.

It is a yet further object of the present invention to provide such a dual link type vehicle suspension which ensures that no very unequal stresses are put upon the front and the rear link members.

It is a yet further object of the present invention to provide such a dual link type vehicle suspension which ensures that while the vehicle is proceeding in a straight line the steering stability is good.

It is a yet further object of the present invention to provide such a dual link type vehicle suspension which ensures that while the vehicle is proceeding in a straight line and is suddenly braked or accelerated no undesirable steering characteristics are manifested.

It is a yet further object of the present invention to provide such a dual link type vehicle suspension which ensures that while the vehicle is turning the roll stability is good.

It is a yet further object of the present invention to provide such a dual link type vehicle suspension which ensures that while the vehicle is turning the resistance to side winds is good.

It is a yet further object of the present invention to provide such a dual link type vehicle suspension which ensures that while the vehicle is turning the toe in, if it alters at all, should alter in the toe in direction.

It is a yet further object of the present invention to provide such a dual link type vehicle suspension which ensures that while the vehicle is turning an understeer characteristic should be produced.

It is a yet further object of the present invention to provide such a dual link type vehicle suspension which ensures good ridability while the vehicle is turning.

According to the most general aspect of the present invention, these and other objects are accomplished by a dual link type vehicle rear suspension for a vehicle, for suspending the body of said vehicle with respect to a wheel of said vehicle, comprising: (a) a wheel support member which supports said road wheel in a rotatable fashion about a horizontal axis generally in the direction lateral to the vehicle body; (b) a first link member, an inboard end of which is coupled to said body of said vehicle to be rotatable with respect thereto about a rotational axis generally in the direction longitudinal to said vehicle body, extending from its said inboard end towards the front of the vehicle at a certain first angle, taken as a signed quantity, to the direction lateral to said vehicle body, and an outboard end of which is coupled to said wheel support member to be rotatable with respect thereto about a rotational axis also generally in the direction longitudinal to said vehicle body; (c) a second link member, an inboard end of which is coupled to said body of said vehicle to be rotatable with respect thereto about a rotational axis generally in the direction longitudinal to said vehicle body, extending from its said inboard end towards the front of the vehicle at a certain second angle, taken as a signed quantity, to the direction lateral to said vehicle body, and an outboard end of which is coupled to said wheel support member to be rotatable with respect thereto about a rotational axis also generally in the direction longitudinal to said vehicle body; (d) a means for biasing said wheel support member with respect to said vehicle body in the downwards direction; (e) a strut rod member extending generally in the direction longitudinal to said vehicle body; (f) a first coupling construction which couples the front end of said strut rod member to said vehicle body with respect to force in the longitudinal direction of said strut rod member; (g) a second coupling construction which couples the rear end of said strut rod member to said wheel support member with respect to force in the longitudinal direction of said strut rod member; and (h) an elastic member interposed in one of said first and second coupling constructions; (i) wherein the sum of said first and said second angles, taken as signed quantities, is greater than zero.

According to such a structure, since the sum of said first and said second angles, taken as signed quantities, is positive, therefore the overall direction of the front and the rear link members, from their inboard ends to their outboard ends, is forwards with respect to the longitudinal direction of the vehicle body. Accordingly, tension and/or compression forces in these front and rear link members are able not only to cancel the inward component of the friction force exerted on the wheel by the ground, but also are able to produce a force in the forwards direction of the vehicle to at least partly cancel the rearwards component of said friction force, and hence there is no absolute requirement (given appropriate or nearly appropriate turning speed) for the strut rod to exert any very great tension force in the forward direction on the wheel support member. Thus, high tension force in the strut rod is not required during all the time that the vehicle is going around the turn, and accordingly the flexible and resilient coupling constructions 6c and 6d at the ends 6a and 6b of this strut rod are not required to be in any very highly compressed state at all times during vehicle turning. Thus, when a further sudden or shock force acts on the rear wheel in the direction towards the rear of the vehicle, such as when said rear wheel passes over a irregularity in the road surface or when the vehicle is suddenly accelerated or is suddenly braked, then the strut rod member and the flexible coupling constructions therefor are not in any partly compressed state. Therefore, the flexible members such as rubber members of these flexible coupling constructions are in an operational zone of relatively low elastic coefficient, and therefore they are able to well and properly provide their function of by their resilience cushioning this shock and moderating it. Thereby the effects of shock and vibration are well mitigated, and do not tend to be transmitted to the inside of the vehicle body. Thereby, the vehicle ridability when turning is improved. In other words, this invention provides a dual link type vehicle suspension which, while the vehicle is turning, keeps the strut rod assembly including its resilient coupling constructions substantially in the most appropriate state for absorbing and dissipating shock and vibration energy.

Further, according to a more particular aspect of the present invention, these and other objects are more particularly and concretely accomplished by a vehicle suspension as specified above, wherein said inboard end of said second link member is coupled to said body of said vehicle to the rearward of said inboard end of said first link member, and said outboard end of said link member is coupled to said wheel support member to the rearward of said outboard end of said first link member; and also, optionally, said first angle and said second angle may be substantially equal to one another, both of them being positive.

According to such a structure, the load distribution of the component towards the rear of the vehicle of the component of the force on the rear wheel acting in the rearwards direction is substantially the same between the front and the rear link member, and thus large difference in the stresses on these members is prevented. Further, if as is optionally preferable the length of said front link member is substantially equal to the length of said rear link member, distortion of the rear suspension configuration caused by such a rearward force component does not interfere with the toe in of the vehicle, and accordingly degradation of the straight ahead operating characteristics of the vehicle is avoided, and while the vehicle is proceeding in a straight line and is suddenly braked or accelerated no undesirable steering characteristics are manifested.

Further, according to a yet more particular aspect of the present invention, these and other objects are yet more particularly and concretely accomplished by a vehicle suspension as specified above, wherein the horizontal distance between said axis of rotation of said wheel and said outboard end of said first link member is substantially less than the horizontal distance between said axis of rotation of said wheel and said outboard end of said second link member; and also comprising coupling constructions linking the first and second link members to the vehicle body and the wheel support member, with link elastic members interposed in between the vehicle body at one end at least of each of the two link members. According to such a structure, when the wheel support member is pushed in the inboard direction by the inward component of the force exerted on the rear wheel by the round, then the compression force applied to the front linkage construction including the front link member will be greater than the compression force applied to the rear linkage construction including the rear link member, and accordingly the compression amount of said front linkage construction will be greater than the compression amount of said rear linkage construction, and hence the toe in of the vehicle will be increased, as compared with the straight line running toe in amount. This provides increased understeer when the vehicle is turning, and thus ensures that while the vehicle is turning the steering stability is good.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and spaces and so on are denoted by like reference symbols in the various figures thereof; in the description, spatial terms are to be everywhere understood in terms of the relevant figures; and:

DESCRIPTION OF THE PREFERRED EMBODIMENTS

Figure 6:
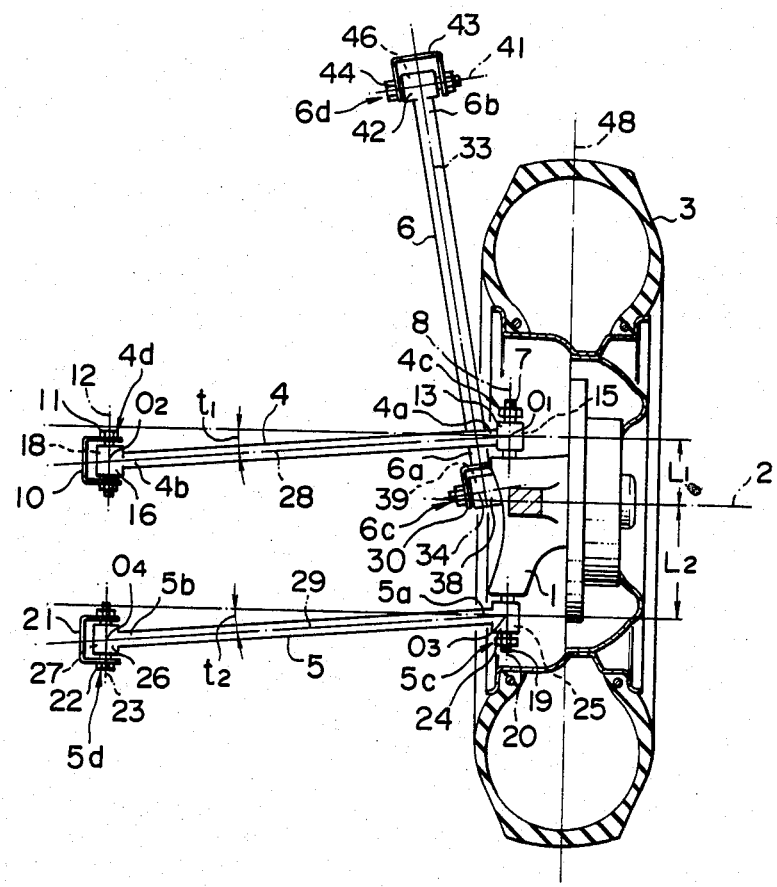
FIG. 6 is a part sectional plan view of a first preferred embodiment of the dual link type suspension for a vehicle rear wheel of the present invention which is adapted for use in a front wheel drive type vehicle, in this first preferred embodiment the angling amount towards the forward direction of the front and the rear link members thereof being substantially greater than zero, and substantially equal.
Figure 7:
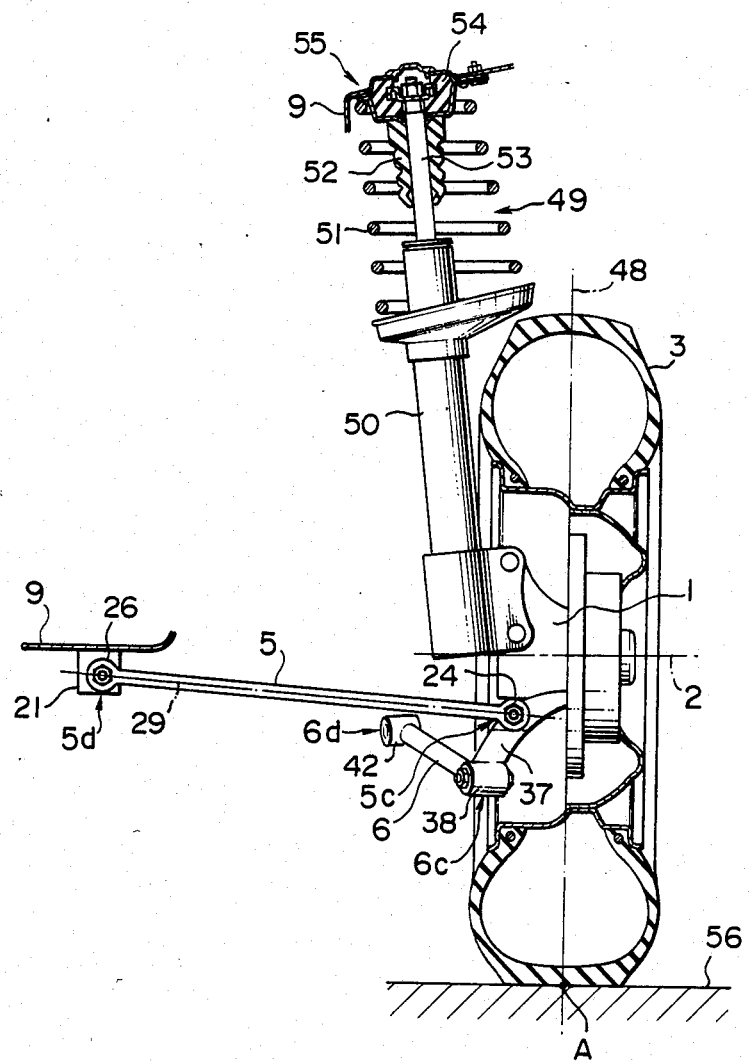
FIG. 7 is a part sectional elevation view of said first preferred embodiment, as seen from the rear end of the vehicle looking towards its front end.

The present invention will now be described with reference to the preferred embodiments thereof, and with reference to the appended drawings. FIG. 6 shows the first preferred embodiment of the dual link type suspension for a vehicle rear wheel of the present invention in part sectional plan view, and FIG. 7 is a rear elevational view thereof; this rear wheel suspension is adapted for use in a front wheel drive type vehicle, and accordingly does not incorporate any arrangements for rotationally powering said rear wheel. As will be explained, this first preferred embodiment of the rear wheel suspension of the present invention is distinguished in that the angling amounts t1 and t2 towards the forward direction of the front and the rear link members thereof are substantially equal. In these figures, the reference numeral 1 denotes a wheel support member which supports a rear road wheel 3 so that said wheel 3 is rotatable with respect to said wheel support member 1 about an axis of rotation 2 extending substantially in the lateral direction to the body (not shown) of the vehicle, via a wheel bearing or the like also not shown, with the central plane of said wheel being denoted by the reference symbol 48. And the reference numerals 4 and 5 respectively denote front and rear link members which extend in the general lateral direction to said vehicle body to outline a control arm construction, the right ends 4a and 5a of said front and rear link members 4 and 5 (i.e. their outboard ends) being pivotally linked by respective coupling constructions 4c and 5c to be described shortly about axes extending generally along the longitudinal direction of the vehicle body to said wheel support member 1, while the left ends 4b and 5b of said front and rear link members 4 and 5 (i.e. their inboard ends) are pivotally linked by respective coupling constructions 4d and 5d also to be described shortly to said vehicle body, also about axes extending generally along the longitudinal direction of the vehicle body. And a strut rod member 6 is provided which extends in the general longitudinal direction to said vehicle body but also somewhat upwards and inwards in the forwards direction as can be seen from FIG. 7, the upper end 6b of said strut rod member 6 from the point of view of FIG. 6 (the front end thereof with respect to the vehicle body) being pivotally linked by a coupling construction 6d to be described shortly to said vehicle body about an axis generally along the lateral direction of the vehicle body but somewhat inclined thereto, and the lower end 6a of said strut rod member 6 from the point of view of FIG. 6 (the rear end thereof with respect to the vehicle body) being pivotally linked by a coupling construction 6c also to be described shortly to the wheel support member 1 also about an axis extending generally along the lateral direction of the vehicle body but somewhat inclined thereto.

In more detail, the outboard or right end 4a in FIG. 6 of the front link member 4 is pivotally linked to the wheel support member 1 by the flexible coupling construction 4c, which is shown in section in FIG. 9 and incorporates a rubber cushion mounting and is constructed as follows. To said outboard end 4a of the front link member 4 there is fixedly secured in a basically perpendicular but somewhat skewed orientation (at an angle of approximately t1 as will be explained later) a tubular member 13, and to the wheel support member 1 there is fixedly screwingly secured a bolt 7 which extends generally along the longitudinal direction of the vehicle body. A rubber bush member 15 is of hollow cylindrical shape, and is press fitted into the tubular member 13. A cylindrical sleeve member 14 is fitted into the central hole through this rubber bush member 15, and the outer surface of this sleeve member 14 is vulcanized to the inner cylindrical surface of said rubber bush member 15. And during assembly of the suspension the cylindrical sleeve member 14 is fitted over the bolt 7 and is held tightly thereon against the wheel support member 1 by a nut 7a and a washer 7b. Thereby, the outboard end 4a of the front link member 4 is linked to the wheel support member 1 by this flexible coupling construction 4c, with a certain amount of pivoting and also of resilience and cushioning being provided in said linking by the interposition of the rubber bush 15 therein, and with the rotational axis 8 of pivoting of said front link member 4 with respect to the wheel support member 1 being defined as the central axis of the bolt 7. The point of intersection of the central axis of the front link member 4 with this rotational axis 8 will be referred to as O1 hereinafter.

And, with regard to the arrangements at the other or inboard end 4b of this front link member 4, said front link member 4 is pivotally linked to the vehicle body by the flexible coupling construction 4d, which is shown in section in FIG. 10 and incorporates a rubber cushion mounting and is constructed as follows. To said inboard end 4b of the front link member 4 there is fixedly secured in a basically perpendicular but somewhat skewed orientation (at an angle of also approximately t1 as will be explained later) a tubular member 16, and to the vehicle body there is fixedly secured a U-shaped bracket 10, through the two ears of which there is fitted a bolt 11 which extends generally along the longitudinal direction of the vehicle body. A rubber bush member 18 is of hollow cylindrical shape, and is press fitted into the tubular member 16. A cylindrical sleeve member 17 is fitted into the central hole through this rubber bush member 18, and the outer surface of this sleeve member 17 is vulcanized to the inner cylindrical surface of said rubber bush member 16. And during assembly of the suspension the cylindrical sleeve member 17 is fitted between the ears of the U-shaped bracket 10, and the bolt 11 is inserted, and then the bolt 11 is fixed by a nut 11a and a washer 11b, thus coupling the sleeve member 17 tightly to the vehicle body. Thereby, the inboard end 4b of the front link member 4 is linked to the vehicle body by this flexible coupling construction 4d, with a certain amount of pivoting and also of resilience and cushioning being provided in said linking by the interposition of the rubber bush 18 therein, with the rotational axis 12 of pivoting of said front link member 4 with respect to the vehicle body being defined as the central axis of the bolt 11 and being substantially parallel to the previously defined rotational axis 8 of the front link member 4 relative to the wheel support member 1. The point of intersection of the central axis of the front link member 4 with this rotational axis 12 will be referred to as O2 hereinafter.

Figure 9:
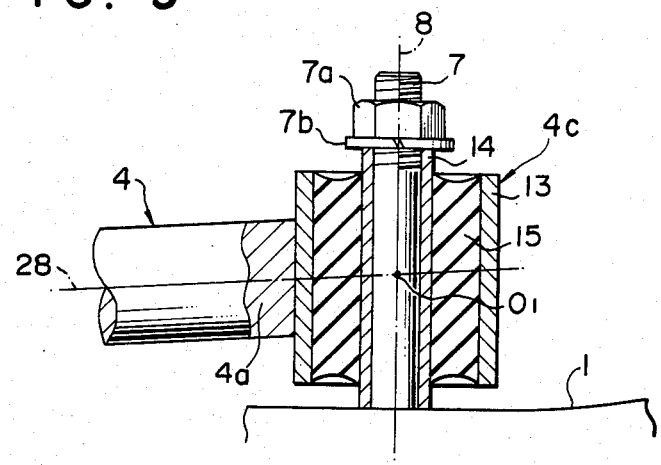
FIG. 9 is an enlarged part sectional view of a flexible coupling construction of the suspension shown in FIG. 6, incorporating a rubber cushion mounting, and used for coupling the wheel end of the front link member of the first preferred embodiment suspension of FIGS. 6 and 7 to a wheel support member.

Similarly with regard to the rear link member 5: the right or outboard end 5a of this rear link member 5 is pivotally linked to the wheel support member 1 by the flexible coupling construction 5c, which is substantially like the flexible coupling construction 4c shown in FIG. 9 for the outboard end 4a of the front link member 4. This coupling construction 5c incorporates a tubular member 24 fixedly secured to said outboard end 5a of the rear link member 5 in a basically perpendicular but somewhat skewed orientation (at an angle of now approximately t2 which in the case of this first preferred embodiment of the present invention is approximately equal to t1 as will be explained later), and to the wheel support member 1 there is fixedly secured a bolt 19 which extends generally along the longitudinal direction of the vehicle body. A rubber bush member 25 is of hollow cylindrical shape, and is press fitted into the tubular member 24. A cylindrical sleeve member not shown in the drawings is fitted into the central hole through this rubber bush member 25, and the outer surface of this sleeve member is vulcanized to the inner cylindrical surface of said rubber bush member 25. And during assembly of the suspension the cylindrical sleeve member is fitted over the bolt 19 and is held tightly thereon against the wheel support member 1 by a nut and a washer. Thereby, the outboard end 5a of the rear link member 5 is linked to the wheel support member 1 by this flexible coupling construction 5c, with a certain amount of pivoting and also of resilience and cushioning being provided in said linking by the interposition of the rubber bush 25 therein, with the rotational axis 20 of pivoting of said rear link member 5 with respect to the wheel support member 1 being defined as the central axis of the bolt 19 and being substantially parallel to the previously defined rotational axes 8 and 12 of pivoting of the front link member 4 respectively relative to the wheel support member 1 and relative to the vehicle body. The point of intersection of the central axis of the rear link member 5 with this rotational axis 20 will be referred to as O3 hereinafter.

Figure 10:
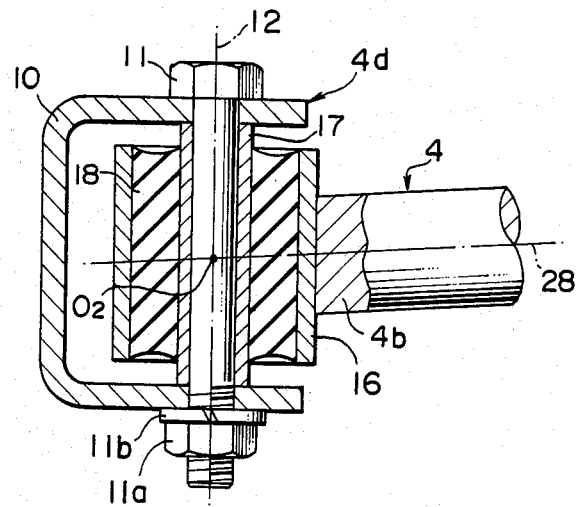
FIG. 10 is an enlarged part sectional view of another flexible coupling construction of the suspension, also shown in FIG. 6 and incorporating a rubber cushion mounting, and used for coupling the body end of said front link member to the vehicle body.

And, with regard to the arrangements at the other inboard end 5b of this rear link member 5, said rear link member 5 is pivotally linked to the vehicle body by the flexible coupling construction 5d, which is substantially like the flexible coupling construction 4d shown in FIG. 10 for the inboard end 4b of the front link member 4. This coupling construction 5d incorporates a tubular member 26 fixedly secured to said inboard end 5b of the rear link member 5 in a basically perpendicular but somewhat skewed orientation (at an angle of also approximately t2 as will be explained later), and to the vehicle body there is fixedly secured a U-shaped bracket 21, through the two ears of which there is fitted a bolt 22 which extends generally along the longitudinal direction of the vehicle body. A rubber bush member 27 is of hollow cylindrical shape, and is press fitted into the tubular member 26. A cylindrical sleeve member not shown in the drawings is fitted into the central hole through this rubber bush member 27, and the outer surface of this sleeve member is vulcanized to the inner cylindrical surface of said rubber bush member 26. And during assembly of the suspension the cylindrical sleeve member is fitted between the ears of the U-shaped bracket 21, and the bolt 22 is inserted, and then the bolt 22 is fixed by a nut and a washer, thus coupling the sleeve member tightly to the U-shaped bracket 21 and thus to the vehicle body. Thereby, the inboard end 5b of the rear link member 5 is linked to the vehicle body by this flexible coupling construction 5d, with a certain amount of pivoting and also of resilience and cushioning being provided in said linking by the interposition of the rubber bush 27 therein, with the rotational axis 23 of pivoting of said rear link member 5 with respect to the vehicle body being defined as the central axis of the bolt 22 and being substantially parallel to the previously defined rotational axes 8 and 12 of pivoting of the front link member 4 respectively relative to the wheel support member 1 and relative to the vehicle body and to the axis 20 of pivoting of the rear link member 5 relative to said wheel support member 1. And the point of intersection of the central axis of the rear link member 5 with this rotational axis 23 will be referred to as O4 hereinafter.

Figure 11:
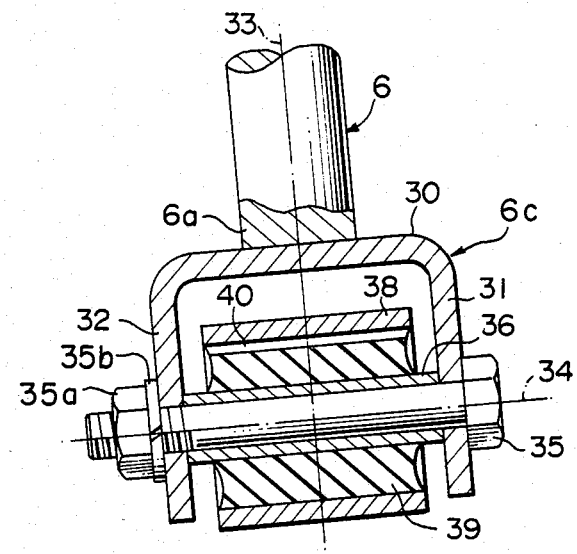
FIG. 11 is an enlarged part sectional view of another flexible coupling construction of the suspension, also shown in FIG. 6 and incorporating a rubber cushion mounting, and used for coupling the wheel end of a strut rod member of the first preferred embodiment suspension of FIGS. 6 and 7 to the wheel support member.

Now, for attaching the rear end 6a of the strut rod member 6 in a pivotable fashion to the wheel support member 1, there is used a flexible coupling construction 6c, which is shown in section in FIG. 11 and incorporates a rubber cushion mounting and is constructed as follows. To the rear end 6a of the strut rod member 6 there is fixedly secured in a perpendicular orientation a U-shaped bracket or yoke 30, and to the wheel support member 1 there is fixedly secured a tubular member 38, which in fact (see FIG. 7) is formed integrally on the end of an arm 37 fixed to said wheel support member 1. Through the two ears 31 and 32 of the U-shaped bracket 30 there is passed a bolt 35 which extends generally along the transverse direction to the vehicle body. A rubber bush member 39 is of hollow cylindrical shape, and is press fitted into the tubular member 38. In the outer surface of this rubber bush member 39 on the side thereof in the direction of the strut rod member 6, i.e. in the front surface relative to the vehicle body of said rubber bush member 39, there is cut a longitudinally extending groove 40; this is done in order to provide a desirable cushioning characteristic for this rubber bush member 39, and will be explained later with reference to the graph of FIG. 13. A cylindrical sleeve member 36 is fitted into the central hole through this rubber bush member 39, and the outer surface of this sleeve member 36 is vulcanized to the inner cylindrical surface of said rubber bush member 38. And during assembly of the suspension the cylindrical sleeve member 36 is fitted between the ears of the U-shaped bracket 30, and the bolt 35 is inserted, and then the bolt 35 is fixed by a nut 35a and a washer 35b, thus coupling the sleeve member 36 tightly to the U-shaped bracket 30 and thus to the strut rod member 6. Thereby, the rear end 6a of the strut rod member 6 is linked to the wheel support member 1 by this flexible coupling construction 6c, with a certain amount of pivoting and also of resilience and cushioning being provided in said linking by the interposition of the rubber bush 39 therein, with the rotational axis 34 of pivoting of said strut rod member 6 with respect to the wheel support member 1 being defined as the central axis of the bolt 35 and being approximately transverse to the vehicle body.

Figure 12:
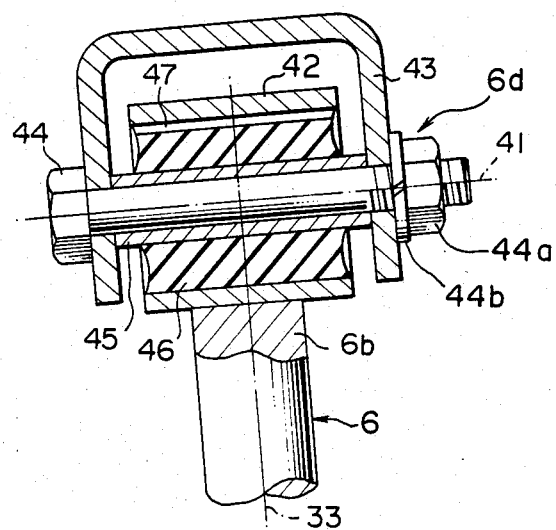
FIG. 12 is an enlarged part sectional view of yet another flexible coupling construction of the suspension, also shown in FIG. 6 and incorporating a rubber cushion mounting, and used for coupling the body end of said strut rod member to the vehicle body.

Similarly, for attaching the front end 6b of the strut rod member 6 in a pivotable fashion to the vehicle body, there is used a flexible coupling construction 6d, which is shown in section in FIG. 12 and incorporates a rubber cushion mounting and is constructed as follows. To the front end 6b of the strut rod member 6 there is fixedly secured in a perpendicular orientation a tubular member 42, and to the vehicle body there is fixedly secured a U-shaped bracket or yoke 43. Through the two ears of the U-shaped bracket 43 there is fitted a bolt 44 which extends generally along the transverse direction to the vehicle body. A rubber bush member 46 is of hollow cylindrical shape, and is press fitted into the tubular member 42. In the outer surface of this rubber bush member 46 on the side thereof opposite to the direction of the strut rod member 6, i.e. in the front surface with respect to the vehicle body of said rubber bush member 46, there is cut a longitudinally extending groove 47; this is done in order to provide a desirable cushioning characteristic for this rubber bush member 46, and will be explained later with reference to the graph of FIG. 13. A cylindrical sleeve member 45 is fitted into the central hole through this rubber bush member 46, and the outer surface of this sleeve member 45 is vulcanized to the inner cylindrical surface of said rubber bush member 42. And during assembly of the suspension the cylindrical sleeve member 45 is fitted between the ears of the U-shaped bracket 43, and the bolt 44 is inserted, and then the bolt 44 is fixed by a nut 44a and a washer 44b, thus coupling the sleeve member 45 tightly to the U-shaped bracket 43 and thus to the vehicle body. Thereby, the front end 6b of the strut rod member 6 is linked to the vehicle body by this flexible coupling construction 6d, with a certain amount of pivoting and also of resilience and cushioning being provided in said linking by the interposition of the rubber bush 46 therein, with the rotational axis 41 of pivoting of said strut rod member 6 with respect to the vehicle body being defined as the central axis of the bolt 44 and being approximately transverse to the vehicle body. As mentioned earlier, the strut rod member 6 extends in the general longitudinal direction to the vehicle body but also somewhat upwards and inwards in the forwards direction.

Referring to FIG. 7, extending substantially in the vertical direction between the wheel support member 1 and the vehicle body there is provided a suspension strut assembly 49. This strut assembly 49 includes a shock absorber 50, a compression coil spring 51, and a travel limiting rubber 52. The compression coil spring 51 is mounted between the vehicle body and the shock absorber 50, with ts upper end pressing against an upper support portion 55 of the vehicle body and with its lower end pressing against the upper end of said shock absorber 50, so that it biases the wheel support member 1 and the wheel 3 downwards with respect to the vehicle body and provides suspension action to keep the vehicle body raised. A shock absorber rod 53 of the shock absorber 50 is coupled at its upper end to said upper support portion 55 of the vehicle body via a cushion rubber member 54. And the travel limiting rubber 52 is mounted around the upper portion of said shock absorber rod 53, so as to receive the shock of the shock absorber 50 when the wheel 3 moves too far in the upward direction with respect to the vehicle body.

With this rear suspension constructed as outlined above, then, in general terms, the downward force due to the weight of the part of the vehicle generally above the wheel 3 is sustained chiefly by the strut assembly 49, in particular by its compression coil spring 51; force in the direction lateral to the vehicle, such as force on the wheel 3 produced by the effects of centrifugal force due to the mass of the vehicle as the vehicle turns to the left or the right, is sustained chiefly by compression or tension forces induced in the front and rear link members 4 and 5; and force in the direction longitudinal to the vehicle, such as force on the wheel 3 produced by the effects of inertia due to the mass of the vehicle as the vehicle is accelerated or decelerated or braked, or force on the wheel 3 due to irregularity in the road surface, is sustained chiefly by compression or tension force induced in the strut rod member 6.

Now more details will be explained with regard to the dimensions and angling of the various parts and members described above. As mentioned above, the front and rear link members 4 and 5 are sloped slightly downwards from their inboard ends 4b and 5b to their outboard ends 4a and 5a through substantially the same angle, and also are angled somewhat forwards from the same point of view; and the angles by which they are thus angled somewhat forwards are designated as t1 and t2, as shown in FIG. 6; corresponding to this, the attachment angles by which the tubular members 13 and 16 of the flexible coupling constructions 4c and 4d fixed respectively to the outboard and inboard ends 4a and 4b of the front link member 4 are inclined from the perpendicular direction to the axis of said front link member 4 are both substantially equal to t1, and similarly the attachment angles by which the tubular members 24 and 26 of the flexible coupling constructions 5c and 5d fixed respectively to the outboard and inboard ends 5a and 5b of the rear link member 5 are inclined from the perpendicular direction to the axis of said rear link member 5 are both substantially equal to t2. And, in this first preferred embodiment, t1 is substantially equal to t2, and accordingly the front and rear link members 4 and 5 are substantially parallel. Thus, in this first preferred embodiment, t1 and t2 are both positive, and t1=t2, and also in particular the sum of t1 and t2 is positive, in accordance with a main principle of the present invention, which is that the two link members 4 and 5 should have an overall forward angling amount.

Further, the effective length of the front link member 4, i.e. the distance between the point O1 at which its central axis meets the axis 8 of its rotation with respect to the wheel support member 1 and the point O2 at which its central axis meets the axis 12 of its rotation with respect to the vehicle body, is substantially equal to the effective length of the rear link member 5, i.e. the distance between the O3 at which its central axis meets the axis 20 of its rotation with respect to the wheel support member 1 and the point O4 at which its central axis meets the axis 23 of its rotation with respect to the vehicle body. Accordingly, when the vehicle wheel 3 is subjected to a force in the rearward direction with respect to the vehicle body, as for example when the vehicle is undergoing sharp braking or sharp acceleration, i.e. to a force in the downwards direction as seen in FIG. 6, the resulting distortion of the parallelogram shape defined by the front and rear link members 4 and 5 and the wheel support member 1 caused by pivoting of the flexible coupling constructions 4c and 4d and 5c and 5d about substantially vertical axes (perpendicular to the plane of the drawing paper in FIG. 6) due to distortion of their rubber bush members does not cause said shape to cease to be a parallelogram, and accordingly the front and rear link members 4 and 5 remain in a parallel state in this case, and so do the line O1–O3 on the wheel support member 1 and the line O2–O4 on the vehicle body, so that substantially no variation of the toe in of the rear wheel 3 of the vehicle occurs, i.e. the wheel support member 1 and the wheel 3 substantially do not rotate about a vertical axis. Accordingly the straight line running characteristics of the vehicle are preserved as good.

Now, as seen in FIG. 7, the outboard ends 4a and 5a of the front and rear link members 4 and 5 are attached to the wheel support member 1 by the coupling constructions 4c and 5c at points somewhat below the axis of rotation 2 of the wheel 3. Also, as viewed in the horizontal plane, i.e. as seen in FIG. 6, the outboard end 4a of the front link member 4 is coupled to said wheel support member 1 by the coupling construction 4c at a point forward of said axis of rotation 2 of the wheel 3 and relatively close to said axis 2, while the outboard end 5a of the rear link member 5 is coupled to said wheel support member 1 by the coupling construction 5c at a point rearward of said axis of rotation 2 of the wheel 3 and relatively far from said axis 2; in other words, the distance L1 in the horizontal direction shown in FIG. 6 from the point O1 to the axis of rotation 2 which is rearward of said point O1 is substantially less than the distance L2 in the horizontal direction from the point O3 to said axis of rotation 2 which is forward of said point O3. This has the following beneficial effect.

When the vehicle is turning and the rear wheel 3 is the outer turning wheel, i.e. when as seen in FIG. 6 the vehicle is moving in the upwards direction and turning to the left, then a sidewise force acts on the rear wheel 3 in the leftwards direction as seen in FIG. 6, and is transmitted therefrom to the wheel support member 1, to be counterbalanced by compression force set up in the front and rear link members 4 and 5. Now, because the distance L1 is substantially less than the distance L2, this means that the compression force induced in the front link member 4 will be substantially greater than the compression force in the rear link member 5. Accordingly, the compression force to which the rubber bush member 15 of the outboard flexible coupling construction 4c for the front link member 4 and the rubber bush member 18 of the inboard flexible coupling construction 4d therefor are subjected will be very substantially greater than the compression force to which the rubber bush member 25 of the outboard flexible coupling construction 5c for the rear link member 5 and the rubber bush member 27 of the inboard flexible coupling construction 5d therefor are subjected, and therefore the amounts by which said rubber bush members 15 and 18 of the front link member 4 are compressed will be substantially greater than the amounts by which said rubber bush members 25 and 27 for the rear link member 5 are compressed. Accordingly, the effective length of the front link member 4 will become somewhat less than the effective length of the rear link member 5, and this will cause the vehicle rear wheel 3 and its wheel support member 1 to rotate somewhat in the clockwise direction as seen in FIG. 6 about an axis perpendicular to the drawing paper in that figure, i.e. about a vertical axis. This will produce a certain increase of the toe in of the rear wheels of the vehicle during this turning process, since the other rear wheel (not shown) which is on the inside of the turn and is somewhat deweighted is not subjected to any comparably great corresponding force leftwards in the sense of the figure. This provides a desirable understeer characteristic for the vehicle during turning.

Figure 8:
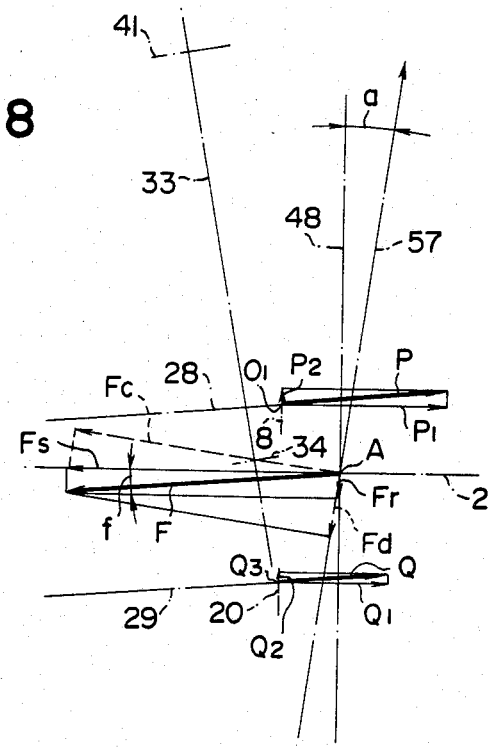
FIG. 8 is a schematic plan view showing the pattern of the horizontal forces on this suspension generated when the vehicle incorporating said first preferred embodiment shown in FIGS. 6 and 7 of the suspension of the present invention is driven at speed round a curve which angles upwards and to the left from the point of view of FIG. 6, thus causing the rear wheel of said figures to be the outer rear wheel performing said curve.
Figure 13:
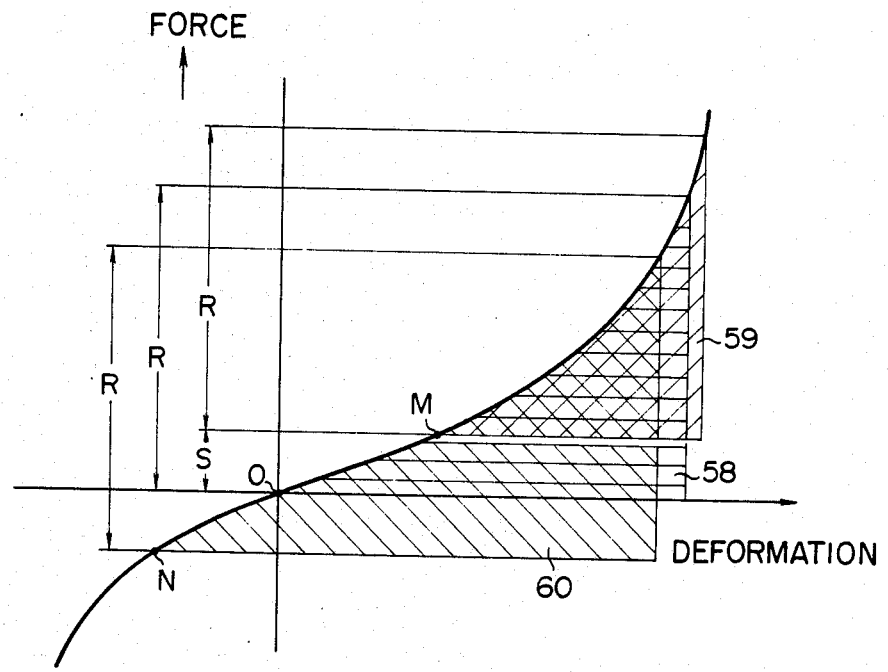
FIG. 13 is a graph, in which longitudinal force on said strut rod member is shown along the vertical axis, and the thereby caused compression amount between the flexible coupling constructions shown in FIGS. 11 and 12 for said strut rod member is shown along the horizontal axis.

Now, with relation to FIG. 8, which is a schematic diagram of the forces acting on the rear wheel 3 and on the wheel support member 1 when the vehicle is turning, and with reference to FIG. 13, which is a graph in which longitudinal force (tension or compression) on the the strut rod member 6 is shown along the vertical axis and the thereby caused compression amount between the flexible coupling constructions 6c and 6d of said strut rod member 6 is shown along the horizontal axis, the advantages of the shown first preferred embodiment of the dual link type suspension for a vehicle rear wheel of the present invention will be explained. First, with regard to the provision of the longitudinally extending grooves 40 and 47 in the rubber bush members 39 and 46 of the flexible coupling constructions 6c and 6c as shown in FIGS. 11 and 12, the reason for providing them is in order to ensure a compression performance as shown in FIG. 13 between these flexible coupling constructions 6c and 6d, i.e. for the effective length of the strut rod member 6 as a whole: as will be understood from the FIG. 13 graph, in the region of relatively low tensile force near the origin O of this graph a relatively small tensile force between the flexible coupling constructions 6c and 6c produces a relatively large amount of compression of the rubber bush members 39 and 46 thereof since the material defining the sides of the grooves 40 and 47 of these members is being compressed at the time, but as the tensile force load increases the proportionality constant between deformation and force of these rubber bush members descreases, until in the relatively high tensile force region far from the origin O of this graph a relatively high tensile force increase between the flexible coupling constructions 6c and 6c produces a relatively small amount of compression increase of the rubber members 39 and 46 thereof, since the grooves 40 and 47 of these rubber bush members 39 and 46 are now fully compressed and their more solid bodies are now being compressed. Further, since the grooves 40 and 47 are only provided on the one sides of the rubber bush members 39 and 46 of the flexible coupling constructions 6c and 6c, i.e. on their respective lower and upper sides in FIGS. 11 and 12 which are their portions which are compressed when the strut rod member 6 is put into tension (as opposed to compression) as the wheel 1 is impelled in the backwards direction with respect to the body of the vehicle, this means that the graph of FIG. 13 is not symmetrical about its origin O, so that the compression performance between the flexible coupling constructions 6c and 6c is quite dissimilar from the tension performance therebetween, and this compression performance progresses much more quickly to a region where the proportionality constant between deformation and force is relatively low. In other words, in the region of a relatively low tensile force load acting on the strut rod member 6 between the flexible coupling constructions 6c and 6c the elastic coefficient provided thereby is relatively low, in the region of a relatively high tensile force load therebetween the elastic coefficient provided thereby is relatively high, and in substantially all regions of compressive load therebetween the elastic coefficient provided thereby is relatively high. This type of asymmetrical performance for the cushioning means 6c and 6d for the strut rod member 6 is provided in order to ensure a good degree of attenuation of vibration between the wheel 3 and the body of the vehicle.

Next, referring to FIG. 8, the forces acting on the rear wheel 3 and on the wheel support member 1 when the vehicle is turning and the rear wheel 3 is the outer turning wheel, i.e. when as seen in FIG. 6 (which is a schematic plan view) the vehicle is moving in the upwards direction and turning to the left, will be explained. In FIG. 8, the line 48 is the horizontal line in the center plane of the rear wheel 3 as in FIG. 6, and the line 57 represents the actual current direction of motion of the vehicle, which is angled at an angle of a to the right (clockwise) of said center line 48 of the plane of the rear wheel 3 because of the aforementioned toe in caused by the differential compression of the flexible coupling constructions of the front and rear link members 4 and 5; this angle a is called the slip angle of this outside rear wheel 3.

The friction force exerted by the ground on the rear wheel 3 is shown in FIG. 8 as the vector F, and is inwards towards the center line of the vehicle and somewhat towards the rear of the vehicle due to the effects of rolling friction. This force vector F can be resolved in two different ways. In the first way, F is resolved into a vector Fd (which may be called the drag force) along the direction of motion 57 of the vehicle in the reverse direction therealong, and a vector Fc (which may be called the cornering force) perpendicular to the direction of motion 57 of the vehicle representing the portion of the centrifugal force on the vehicle exerted through this one 3 of the rear wheels. And, in the second way, F is resolved into a vector Fr (which may be called the rearward or rolling resistance force) along the central line 48 of the plane of the wheel 3 in the reverse direction representing the rolling friction on the rear wheel 3, and a vector Fs (which may be called the inward or side force) perpendicular to said central line 48 of the plane of the wheel 3. And, considering this second resolution of the friction force F, the angle f which F makes towards the rear of the vehicle (counterclockwise) from the direction perpendicular to the central line 48 of the plane of the wheel 3, is equal to arctan(Fr/Fs).

Now, this first preferred embodiment of the suspension of the present invention is designed, considering a typical turn for the vehicle, i.e. considering a turn of a standard tightness and speed which will hereinafter be referred to as the "standard turn", so that the common value of the angles t1 and t2 of angling of the suspension link members 4 and 5 towards the front of the vehicle is substantially equal to this angle f relating to said standard turn by which the frictional force vector F is angled towards the rear of the vehicle. In this case, as will be easily understood by one of mathematical skills based upon this description, this frictional force F will be borne by the compression in the suspension link members 4 and 5, substantially only, and no substantial compression or tension load will be put on the strut rod member 6 in the direction 33 of its central axis. In more detail, in this state, compression forces P and Q respectively will be induced in the suspension link members 4 and 5, as shown in FIG. 8, with (approximately) $P+Q=F$; and the magnitude of the compression force P in the front link member 4 will be substantially greater than the magnitude of the compression force Q in the rear link member 5; this correlates with the explanation given previously as to the increased toe in of the rear wheel 3 caused by the differential compression of the rubber members of the coupling construction of the front and the rear link members produced by the cornering force. Thus, resolving the forces P and Q in the directions perpendicular and parallel to the central line 48 of the plane of the wheel 3, respective components P1, P2 and Q1, Q2 are produced; and (approximately) $Fs=P1+Q1$, while (also approximately) $Fr=P2+Q2$. Under the assumption that the turn which the vehicle is executing is equivalent to the standard turn defined above, since no substantial compression or tension load is being put by the friction force F exerted on the wheel 3 by the ground on the strut rod member 6 in the direction 33 of its central axis, therefore the rubber members 39 and 46 of the flexible coupling constructions 6c and 6d are in the substantially uncompressed state, and accordingly, with reference to FIG. 13, the system including said strut rod member 6 and said flexible coupling constructions 6c and 6d is in the origin state, i.e. is at the point O in that figure, under substantially zero force loading and substantially zero deformation.

In this condition, if a force acts on the wheel 3, i.e. the outer rear turning wheel, for example in the direction to the rear of the vehicle, such as may be suffered when said wheel 3 passes over a irregularity in the road surface or when the vehicle is suddenly accelerated or is suddenly braked, then as a reaction a tension load will necessarily be set up in the system including the strut rod member 6 and the flexible coupling constructions 6c and 6d. If the magnitude of this tension force is designated as R, then as explained earlier it will cause the portions of the rubber bushes 39 and 46 which are on the sides of the axes 34 and 41 of these bushes 39 and 46 remote from the strut rod member 6 to be compressed, i.e. said load R will cause the portions of these rubber bushes 39 and 46 including the grooves 40 and 47 to be compressed. Accordingly, the amount of energy which can be absorbed by the two coupling constructions 6c and 6d is as indicated in FIG. 13 by the horizontally hatched area 58.

Figure 1:
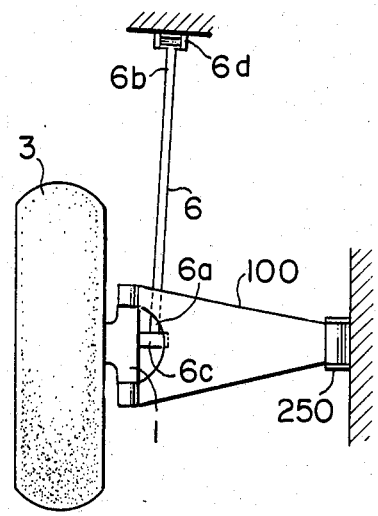
FIG. 1 is a schematic plan view of a prior art form of vehicle rear suspension, which includes a plate member instead of link members.
Figure 2:
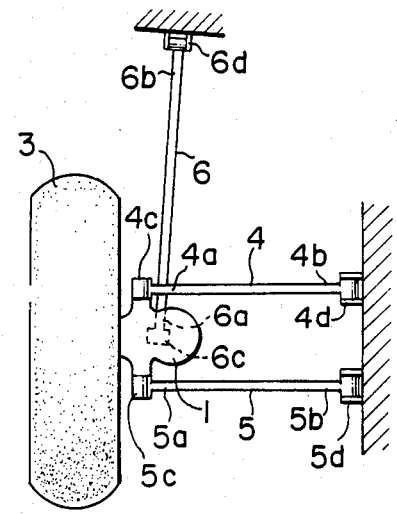
FIG. 2 is a part sectional plan view of a prior art dual link type suspension for a vehicle rear wheel, in which the angling amount of both the front and the rear link members thereof is approximately zero.
Figure 4:
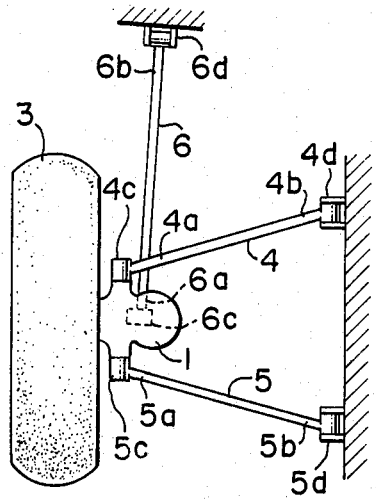
FIG. 4 is a part sectional plan view, similar to FIG. 2, of another prior art dual link type suspension for a vehicle rear wheel, in which the angling amounts of both the front and the rear link members thereof are non zero and are also approximately equal and opposite in sign.
Figure 5:
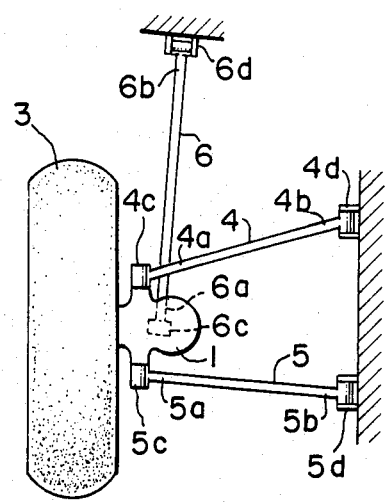
FIG. 5 is a part sectional plan view, similar to FIGS. 2 and 4, of yet another prior art dual link type suspension for a vehicle rear wheel, in which the angling amounts of both the front and the rear link members thereof are non zero and opposite in sign, with the front link member thereof angling in the rearward direction by a greater angle than the rear link member angles in forward direction.
Figure 3:
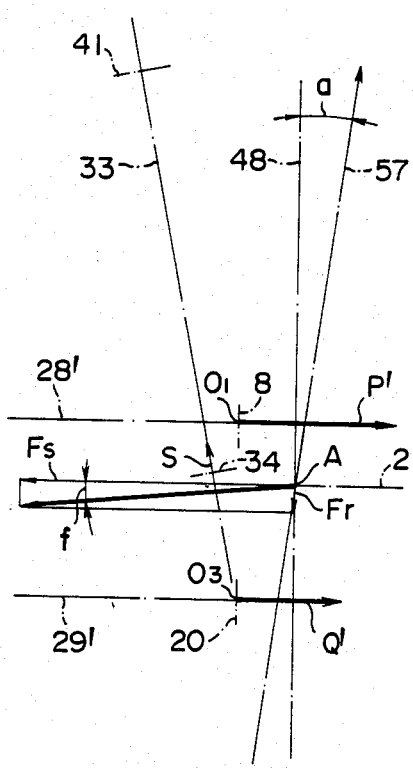
FIG. 3 is a schematic illustration of the forces on said prior art FIG. 2 suspension, when the vehicle is executing a turn in which the wheel of FIG. 2 is the outside wheel.

On the other hand, to compare this performance with the performance during similar cornering of a conventional type of suspension with front and rear link members 4 and 5 extending substantially perpendicularly to the central axis of the vehicle and to the central plane of the wheel 3, as shown in FIG. 2 and as discussed previously with reference to the force diagram of FIG. 3, in such a conventional case neither compression nor tension in the front and rear link members 4 and 5 can provide any force in the direction of the central line 48 of the plane of the wheel 3 to cancel the component Fr of the force on the wheel from the ground in the direction of said central line 48, although they can and do provide forces P' and Q' in the direction perpendicular to this center line 48 to cancel the component Fs of said force on the wheel 3 perpendicular to the direction of said central line 48 (thus, approximately, $P'+Q'=Fs$), and accordingly an appropriate tension force is necessarily generated in the strut rod member 6 to cancel the rearward force component Fr. And, as will be easily understood, the magnitude of this tension force S in the strut rod member 6 is close to that of said rearward force Fr. Therefore, this force S will cause the portions of the rubber bushes 39 and 46 including the grooves 40 and 47 to be compressed at substantially all times, i.e. to be precompressed. This puts the system including the strut rod member 6 and the flexible coupling constructions 6c and 6d in the state indicated by the point M in FIG. 13, i.e. not at the origin point O as was the case with the suspension according to the first preferred embodiment of the present invention but some way up the characteristic curve of that figure, under substantial force loading equal to S and substantial deformation. In this state, if a further load R is imposed on the strut rod member 6 by the wheel 3 passing over a irregularity in the road surface or by the vehicle being suddenly accelerated or being suddenly braked, as in the previous case, then the amount of energy which can be absorbed by the two coupling constructions 6c and 6d in this prior art case is as indicated in FIG. 13 by the rightwardly and upwardly hatched area 59, which is considerably smaller than the area 58 corresponding to the amount of energy which can be absorbed by the two coupling constructions 6c and 6d in the case of the first preferred embodiment of the present invention described above. This shows that the shock absorption capability of the system including the strut rod member 6 and the flexible coupling constructions 6c and 6d in the case of the first preferred embodiment of the present invention shown in FIG. 6 is substantially greater than the shock absorption capability of the system including the strut rod member 6 and the flexible coupling constructions 6c and 6d in the prior art case of FIG. 2. Accordingly, during a turn, the present invention provides much better cushioning of bumps and prevention of the transmission of shock and vibrations from the outside rear wheel of the vehicle to the vehicle body, and accordingly is very beneficial from the point of view of vehicle ridability. And these beneficial effects are obtained by virtue of the fact that the sum of the angles t1 and t2 is greater than zero so that the two link members 4 and 5 have an overall forward angling amount.

Figure 14:
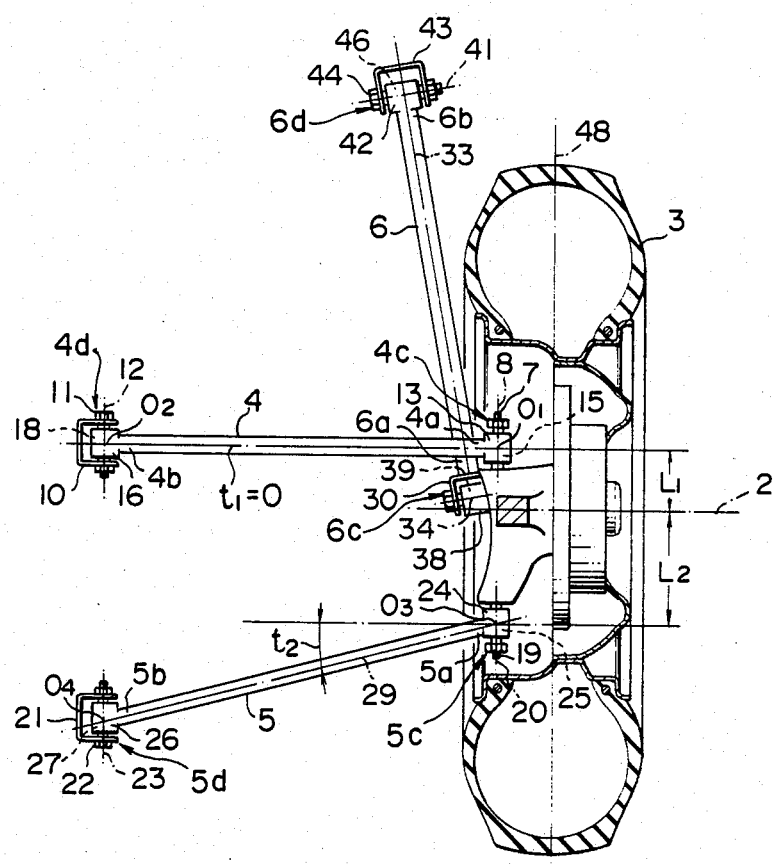
FIG. 14 is a part sectional plan view, similar to FIG. 6 relating to the first preferred embodiment, of a second preferred embodiment of the dual link type suspension for a vehicle rear wheel of the present invention which is again adapted for use for a front wheel drive type vehicle, in this second preferred embodiment the angling amount towards the forward direction of the rear link member thereof being more pronounced than in the first preferred embodiment while the angling amount towards the forward direction of the front link member is substantially nil.

FIG. 14 is a part sectional plan view, similar to FIG. 6 relating to the first preferred embodiment, showing the second preferred embodiment of the dual link type suspension of the present invention, which is again adapted for use for a front wheel drive type vehicle; in the figures and descriptions of this second preferred embodiment, parts, forces and other features which correspond to like elements of the first preferred embodiment are designated by the same reference symbols. And FIG. 15, similar to FIG. 8 relating to the first preferred embodiment, is a schematic plan view showing the pattern of the horizontal forces on the FIG. 14 suspension generated when the vehicle is driven at speed round a curve which angles upwards and to the left from the point of view of FIG. 14, thus causing the wheel of said figure to be the outer rear wheel on said curve.

In this second preferred embodiment the constructions of the various members and elements are basically the same as in the first preferred embodiment described above, but the dimensions and angles thereof are different: the angling amount towards the forward direction of the front link member 4 is substantially nil, while the angling amount towards the forward direction of the rear link member 5 is more pronounced than in the first preferred embodiment. In other words, from its end 4b which is pivotally secured to the body of the vehicle by the flexible coupling construction 4d, the front link member 4 extends substantially perpendicularly to the longitudinal axis of the vehicle, i.e. is angled towards the front of the vehicle from the transverse direction to the longitudinal axis thereof at an angle t1 of substantially zero; while on the other hand, from its end 5b which is pivotally secured to the body of the vehicle by the flexible coupling construction 5d, the rear link member 5 extends generally transversely to the vehicle but is angled towards the front of the vehicle from the transverse direction to the longitudinal axis thereof at a positive angle t2 which is substantially greater than the angle t2 of the first preferred embodiment. Thus, again in this second preferred embodiment, the sum of the angles t1 and t2 is greater than zero, and the two link members 4 and 5 have an overall forward angling amount.

Corresponding to this altered construction, in this second preferred embodiment the rotational axis 8 provided by the flexible coupling construction 4c at the outboard end of the front link member 4 extends substantially perpendicular to the central axis of said front link member 4; the rotational axis 12 provided by the flexible coupling construction 4d at the inboard end of said front link member 4 also extends substantially perpendicular to the central axis of said front link member 4; the rotational axis 20 provided by the flexible coupling construction 5c at the outboard end of the rear link member 5 extends at an angle approximately equal to t2 to a line perpendicular to the central axis of said rear link member 5; and the rotational axis 23 provided by the flexible coupling construction 5d at the inboard end of said rear link member 5 also extends at an angle approximately equal to t2 to a line perpendicular to the central axis of said rear link member 5. Thus, again, all these rotational axes 8, 12, 20, and 23 extend substantially parallel to the longitudinal axis of the vehicle. And as will be seen from the figure the shape outlined by the front and rear link members 4 and 5 and the lines joining their ends now is not a parallelogram, as was the case in the first preferred embodiment, but is a non isosceles trapezoid, and thus the lengths of the front and rear link members 4 and 5 are not equal. Apart from the above details, the construction of this second preferred embodiment is the same as that of the first preferred embodiment; in particular, the strut rod assembly including the strut rod 6 is quite the same as in said first embodiment.

Figure 15:
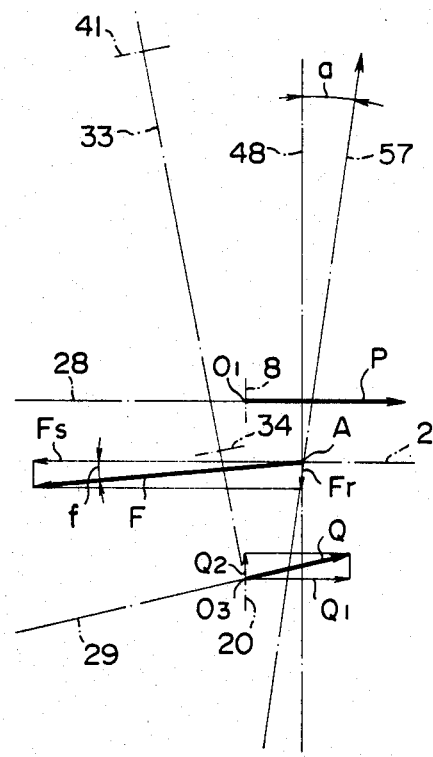
FIG. 15 is similar to FIG. 8 relating to the first preferred embodiment, being a schematic plan view showing the pattern of the horizontal forces on the suspension generated when the vehicle incorporating the second preferred embodiment of the present invention shown in FIG. 15 is driven at speed round a curve which angles upwards and to the left from the point of view of FIG. 15, thus causing the wheel of said figure to be the outer rear wheel on said curve.

When the vehicle is turning and the rear wheel 3 is the outer turning wheel, i.e. when as seen in FIG. 14 the vehicle is moving in the upwards direction and turning to the left, then the forces acting on the rear wheel 3 and on the wheel support member 1 are as schematically shown in FIG. 15. Thus, compression forces P and Q respectively are induced in the suspension link members 4 and 5, as shown in FIG. 15; and the magnitude of the compression force P in the front link member 4 will again be substantially greater than the magnitude of the compression force Q in the rear link member 5; this correlates with the facts relating to the first preferred emboidment anent the increased toe in of the rear wheel 3 caused by differential compression of the rubber members of the coupling constructions of the front and the rear link members produced by the cornering force. Resolving the forces P and Q in the directions perpendicular and parallel to the central line 48 of the plane of the wheel 3, respective components P, zero, and Q1, Q2 are produced; and, under the assumption that the turn which the vehicle is executing is equivalent to the standard turn that defined in a manner similarly to the above with respect to the first preferred embodiment, (approximately) $Fs=P+Q1$, while (also approximately) $Fr=Q2$. Thus, again, since no substantial compression or tension load is being put by the friction force F exerted on the wheel 3 by the ground on the strut rod member 6 in the direction 33 of its central axis, therefore the rubber members 39 and 46 of the flexible coupling constructions 6c and 6d are in the substantially uncompressed state, and accordingly, again with reference to FIG. 13, the system including said strut rod member 6 and said flexible coupling constructions 6c and 6d is in the origin state, i.e. is at the point O in that figure, under substantially zero force loading and substantially zero deformation.

In this condition, if a force acts on the wheel 3, i.e. the outer rear turning wheel, for example in the direction to the rear of the vehicle, such as may be suffered when said wheel 3 passes over a irregularity in the road surface or when the vehicle is suddenly accelerated or is suddenly braked, then as a reaction a tension load will necessarily be set up in the system including the strut rod member 6 and the flexible coupling constructions 6c and 6d. If the magnitude of this tension force is designated as R, then as in the case of the first preferred embodiment it will cause the portions of the rubber bushes 39 and 46 which are on the sides of the axes 34 and 41 of these bushes 39 and 46 remote from the strut rod member 6 to be compressed, i.e. said load R will cause the portions of these rubber bushes 39 and 46 including the grooves 40 and 47 to be compressed. Accordingly, the amount of energy which can be absorbed by the two coupling constructions 6c and 6d is as indicated in FIG. 13 by the horizontally hatched area 58. And thus the same advantages are available with this second preferred embodiment, as were available with the first preferred embodiment detailed above: in particular, the present invention provides much better cushioning of bumps and prevention of the transmission of shock and vibrations from the outside rear wheel of the vehicle to the vehicle body, and accordingly is very beneficial from the point of view of vehicle ridability. And these beneficial effects are obtained by virtue of the fact that the sum of the angles t1 and t2 in this second preferred embodiment also is again greater than zero so that the two link members 4 and 5 have an overall forward angling amount.

Further, in this second preferred embodiment, the effective length of the front link member 4, i.e. the distance between the point O1 at which its central axis meets the axis 8 of its rotation with respect to the wheel support member 1 and the point O2 at which its central axis meets the axis 12 of its rotation with respect to the vehicle body, is substantially less than the effective length of the rear link member 5, i.e. the distance between the point O3 at which its central axis meets the axis 20 of its rotation with respect to the wheel support member 1 and the point O4 at which its central axis meets the axis 23 of its rotation with respect to the vehicle body. Accordingly, when the vehicle wheel 3 is subjected to a force in the rearward direction with respect to the vehicle body, i.e. to a force in the downwards direction as seen in FIG. 6, as for example in the above described case when the vehicle is undergoing sharp braking or sharp acceleration, then the resulting distortion of the trapezoid shape defined by the front and rear link members 4 and 5 and the wheel support member 1 caused by pivoting of the flexible coupling constructions 4c and 4d and 5c and 5d about substantially vertical axes (perpendicular to the plane of the drawing paper in FIG. 6) due to distortion of their rubber bush members cause the opposite sides in the vehicle longitudinal direction of said shape to cease to be parallel to one another, and accordingly the line O1-O3 on the wheel support member 1 and the line O2-O4 on the vehicle body do not remain parallel but the line O1-O3 tilts inwards at its front end O1, so that the toe in of the rear wheel 3 of the vehicle is increased, i.e. the wheel support member 1 and the wheel 3 rotate substantially in the counterclockwise direction in FIG. 14 about a vertical axis. Accordingly the straight line running characteristics of the vehicle are specially good, since such increase of toe in upon braking contributes to good stability.

A further additional advantage of this construction according to the second preferred embodiment of the present invention is that, because from its end 4b which is pivotally secured to the body of the vehicle by the flexible coupling construction 4d the front link member 4 extends substantially perpendicularly to the longitudinal axis of the vehicle, i.e. is angled towards the front of the vehicle from the transverse direction to the longitudinal axis thereof at an angle t1 of substantially zero, thereby the roll stability of the vehicle is improved. Therefore the vehicle is better capable of withstanding sudden torque around its roll axis, such as may be imposed by side winds or the like.

Thus it is seen that in both the shown preferred embodiments of the present invention, when the vehicle is turning, and when a force impacts on the rear wheel which is on the outside of the turn in the direction towards the vehicle rear, as for example when this outer rear wheel passes over a irregularity in the road surface or when the vehicle is suddenly accelerated or is suddenly braked, then this impact force will be effectively absorbed by the rubber bush members provided at the front and rear ends of the strut rod member, and thus shock and vibrations are not much transmitted to the body of the vehicle. Accordingly, the ridability of the vehicle while turning is improved and its suspension characteristics are made better. In the case that force impacts on the rear wheel which is on the inside of the turn in the direction towards the vehicle rear, then the reverse effect to that described above will take place in the rubber bush members provided at the front and rear ends of the strut rod member, but, since this inside rear wheel is deweighted during the turn and the frictional force thereon is accordingly low, and since the speed of said inside rear wheel is also lower than that of the outside rear wheel, this reverse effect is very much smaller in magnitude than the effect on the outside rear wheel, and may accordingly be disregarded.

Of course, although the preceding discussion has been couched in terms of a turn of a standard tightness and speed which will hereinafter be referred to a the "standard turn", so that the values of the angles t1 and t2 of angling of the suspension link members 4 and 5 towards the front of the vehicle were chosen in view of the value of the angle relating to said standard turn by which the vector F of the frictional force produced thereby was angled towards the rear of the vehicle, nevertheless in practice various turns executed by the vehicle will necessarily be of various different tightnesses and speeds, and the angles t1 and t2 of the front and rear suspension link members 4 and 5 cannot be chosen so that for every turn the link rod member 6 is in the substantially unstressed state. However, typically in the implementation of the present invention the angles t1 and t2 of the front and rear suspension link members 4 and 5 are chosen so that for an average type of turn the link rod members 6 is in the substantially unstressed state. Then, if during a particular turn the actual turning angle and speed are in combination effectively less than the standard turning angle and speed, in this case the strut rod member 6 will actually be in compression, and, referring to FIG. 13, the rubber bushes 39 and 46 of the flexible coupling constructions 6a and 6b of this strut rod member 6 will be in the compressed state denoted by N, and thus, when a force impacts on the rear wheel 3 in the direction towards the vehicle rear, as for example due to passing over a irregularity in the road surface or when the vehicle is suddenly accelerated or is suddenly braked, then the amount of energy which can be absorbed by the two coupling constructions 6c and 6d in this case is as indicated in FIG. 13 by the leftwardly and upwardly hatched area 60, which is even larger than the area 58 corresponding to the amount of energy which can be absorbed by the two coupling constructions 6c and 6d, when the situation just before the impact of the force is that the strut rod member 6 is in the neutral state, i.e. is substantially neither in compression nor in tension.

In the embodiments described above, both the angles t1 and t2 by which respectively the front and the rear suspension link members 4 and 5 were angled towards the front of the vehicle were positive or zero, but this is not essential for the benefits of the present invention to be realized. In a variant embodiment, it would be possible for the structure to be as the second preferred embodiment of FIG. 14, but with the front link member 4 angling forward towards the front of the vehicle as viewed from its outboard end 4a towards its inboard end 4b through an angle t1, such an angle being expressed as negative, with the rear link member 5 angling backwards towards the rear of the vehicle as viewed from its outboard end 5a towards its inboard end 5b through an angle t2, such an angle being expressed as positive, and with the absolute value of this angle t2 being greater than the absolute value of the angle t1 when L1 is equal to L2, but generally, including the cases where L1 is not equal to L2, with the sum of L2xtan (t1) and L1xtan (t2) being a substantial positive value. This would still exemplify the principle of the present invention. Further, although in the two preferred embodiments shown the point of pivoting of the inboard end 4b of the front link member 4 to the body of the vehicle, i.e. the flexible coupling construction 4d, was forward in the longitudinal direction of the vehicle from the central rotational axis 2 of the rear wheel 3, in fact in another possible variant embodiment this point of pivoting could be even with said axis 2, or could be rearward of it. Such a type of construction further improves the understeer characteristics of the vehicle, and further improves the anti roll characteristics, as when for example the vehicle is subjected to side winds. Also, it improves the straight driving steering stability characteristics when the vehicle is subjected to sudden braking or sudden acceleration. Yet further, in another possible variant embodiment, it would be possible for the structure to be as the first preferred embodiment of FIG. 6, but with the effective length of the front link member 4 shorter than the effective length of the rear link member 5. This would again improve the straight driving steering stability characteristics when the vehicle is subjected to sudden braking or sudden acceleration.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. For example, although the present invention has been shown and described in terms of a rear suspension for a vehicle of the front wheel drive type, in which the rear wheels are not driven, in fact the present invention is not to be conceived of as limited to this application, and in other possible circumstances it would be possible to apply the present invention to a dual link type rear suspension of a rear wheel drive vehicle. Other variations are also possible. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follows.

What is claimed is:

1. A dual link suspension for suspending a body of a vehicle with respect to a wheel, comprising:

a wheel support member for supporting said wheel to be rotatable about a horizontal axis generally lateral to said vehicle body, a front link member extending generally horizontally and laterally to said vehicle body and generally flexibly connected with said vehicle body at an inboard end thereof and with said wheel support member at an outboard end thereof, the connection between said front link member and said wheel support member being forward from said axis of rotation of said wheel by a first distance L1, a rear link member extending generally horizontally and laterally to said vehicle body on a rear side of said front link member and generally flexibly connected with said vehicle body at an inboard end thereof and with said wheel support member at an outboard end thereof, the connection between said rear link member and said wheel support member being rearward from said axis of rotation of said wheel by a second distance L2, and a strut rod member extending generally horizontally and longitudinally to said vehicle body and generally flexibly connected with said vehicle body at one end thereof and with said vehicle support member at another end thereof, wherein said front and rear link members are inclined relative to an exact lateral direction of said vehicle body by a first angle t1 and a second angle t2, respectively, and wherein, by expressing said first and second angles in positive values when said front and rear link members are inclined rearwardly as viewed from said outboard ends thereof toward said inboard ends thereof, respectively, while in negative values when said front and rear link members are inclined forwardly as viewed from said outboard ends thereof toward said inboard ends thereof, respectively, wherein the sum of L2×tan(t1) and L1×tan(t2) is a substantial positive value.

2. A dual link suspension of claim 1, wherein said front and rear link members are both inclined rearwardly as viewed from said outboard ends thereof toward said inboard ends thereof so that said first and second angles are both positive.

3. A dual link type suspension according to claim 1, wherein said front link member extends in said exact lateral direction while said rear link member is inclined rearwardly as viewed from said outboard end thereof toward said inboard end thereof so that said first angle is zero while said second angle is positive.

4. A dual link type suspension of claim 1, wherein at least one of said generally flexible connections between said one end of said strut rod member and said vehicle body and between said another end of said strut rod member and said wheel support member has a force-deformation characteristic which force increases at rates larger than a linear rate relative to increase of deformation.

* * * * *